(12) United States Patent
Uchimoto et al.

(10) Patent No.: US 7,752,033 B2
(45) Date of Patent: Jul. 6, 2010

(54) TEXT GENERATION METHOD AND TEXT GENERATION DEVICE

(75) Inventors: Kiyotaka Uchimoto, Tokyo (JP); Hitoshi Isahara, Tokyo (JP); Satoshi Sekine, New York, NY (US)

(73) Assignee: National Institute of Information and Communications Technology, Independent Administrative Institution, Tokyo (JP)

( * ) Notice: Subject to any disclaimer, the term of this patent is extended or adjusted under 35 U.S.C. 154(b) by 725 days.

(21) Appl. No.: 10/507,912

(22) PCT Filed: Mar. 4, 2003

(86) PCT No.: PCT/JP03/02529

§ 371 (c)(1),
(2), (4) Date: Sep. 16, 2004

(87) PCT Pub. No.: WO03/079224

PCT Pub. Date: Sep. 25, 2003

(65) Prior Publication Data

US 2005/0171759 A1    Aug. 4, 2005

(30) Foreign Application Priority Data

Mar. 18, 2002    (JP)    ............... 2002-074270

(51) Int. Cl.
*G06F 17/27* (2006.01)
(52) U.S. Cl. ............... 704/9; 704/1; 704/10; 715/261; 707/3; 707/4; 707/5; 707/6
(58) Field of Classification Search ............ 704/1, 704/9, 10; 707/1–6; 715/261
See application file for complete search history.

(56) References Cited

U.S. PATENT DOCUMENTS

| 4,438,505 | A  | * | 3/1984  | Yanagiuchi et al. ............ 704/7 |
| 5,210,689 | A  | * | 5/1993  | Baker et al. .................... 704/1 |
| 6,820,075 | B2 | * | 11/2004 | Shanahan et al. .............. 707/3 |
| 7,177,797 | B1 | * | 2/2007  | Micher et al. .................. 704/9 |

FOREIGN PATENT DOCUMENTS

| EP | 1 469 398 A1 | 10/2004 |
| JP | 5-250407 A   | 9/1993  |
| JP | 7-249039 A   | 9/1995  |

(Continued)

OTHER PUBLICATIONS

Uchimoto et al. "Saidai Entropy Model o Mochiita Nihongo Text no Ikkan Shori", The Japanese Society for Artificial Intelligence Kenkyu Shiryo SIG-CII-2000-NOV-09, Nov. 14, 2000.

(Continued)

*Primary Examiner*—David R Hudspeth
*Assistant Examiner*—Lamont M Spooner
(74) *Attorney, Agent, or Firm*—Birch, Stewart, Kolasch & Birch, LLP

(57) ABSTRACT

A text generation method and a text generation device generate a meaningful text even though the number of input keywords is insufficient. In order to achieve this object, keywords are input to the text generation device. In the text generation device, a Bunsetsu-generation-rule acquisition unit acquires a Bunsetsu generation rule from a corpus and a Bunsetsu-candidate generation unit generates Bunsetsu candidates from the keywords. A text candidate generation unit generates text candidates with assuming a dependency relation among the Bunsetsu candidates. An evaluation unit evaluates the text candidates and outputs text in accordance with the evaluation.

11 Claims, 4 Drawing Sheets

FOREIGN PATENT DOCUMENTS

| | | |
|---|---|---|
| JP | 2003-196280 | 7/2003 |
| JP | 2003-271592 A | 9/2003 |

OTHER PUBLICATIONS

Uchimoto et al. "Corpus kara no Gojun no Gakushu", Information Processing Society of Japan Kenkyu Hokoku 2000-NL-135-8, vol. 2000, No. 11, pp. 55-62, Jan. 27, 2000.

Uchimoto et al., "Text Generation from Keywords", Howard International House and Academia Sinica, Aug. 24, 2002-Sep. 1, 2002, Taipei, Taiwan, 7 pages.

Kakigahara et al., "Completion of Japanese Sentences by Inferring Function Words from Content Words", Proceedings of the 12th Conference on Computational Linguistics, vol. 1, Aug. 22, 1988-Aug. 27, 1988, pp. 291-296.

Langkilde et al., "Generation that Exploits Corpus-Based Statistical Knowledge", URL:http://acl.ldc.upenn.edu/P/P98/P98-111, sections 1-5, 7 pages, 1998.

Berger et al., "Information retrieval as statistical translation", In proceedings of the 1999 ACM Sigir Conference on Research and Development in Information Retrieval, Aug. 15, 1999-Aug. 19, 1999, pp. 222-229, 7 pages.

* cited by examiner

TEXT GENERATION METHOD AND TEXT GENERATION DEVICE

TECHNICAL FIELD

The present invention relates to a method and a device for processing natural language and, in particular, to a method for generating text from several keywords.

BACKGROUND ART

Text generation is one of the elemental technologies used for a variety of natural language processing applications, such as a machine translation, summarization, and dialogue systems. Recently, many corpora have become available, and therefore, these corpora are used for generating natural text. One typical example is a language model used for machine translation, which translates a source language to a target language.

For example, Japanese Patent Application No. 2001-395618 by the present inventors discloses a text generation system in which replaced words and phrases in a target language are ordered in a sequence having the most likelihood so as to generate the target language. In general, an input to a language model is a word set. The function of the language model is primarily to sort these words.

Such a known system assumes that sorting input words in a word set can generate natural language text. That is, a word set for generating natural text must be given by a translation model without excess and shortages.

However, this assumption requires a large translation corpus. Even when the Japanese language, which has a relatively excellent corpus, is the source language, the above-described known method sometimes cannot provide a satisfactory text generation, depending upon the status of the translation corpus of the target language and the corpus of the target language.

Additionally, although the above-described patent document can complement some words, it is only supplementary and cannot efficiently complement the associated words.

This problem is not limited to machine translation. In general, the problem occurs in any text generation. Similarly, if a source language text is not complete, that is, if the source language text is a result of erroneous OCR recognition or erroneous speech recognition, accurate text generation cannot be obtained, which is a problem.

DISCLOSURE OF INVENTION

Accordingly, the present invention provides a method and a device for generating a meaningful text when there are insufficient input keywords.

To solve the above-described problem, the present invention discloses the following text generation method.

That is, the text generation method for generating text of a sentence or paragraph includes an input step in which one or more words are input as keywords.

The text generation method further includes a character-unit candidate generation step for generating character unit candidates from the keywords; a text candidate generation step for generating text candidates with assuming a dependency relation among the character units; an evaluation step for evaluating the text candidates; and an output step for outputting at least one of the evaluated text candidates.

In the input step, a word having a dependency relation to an input word may be input as an additional keyword using a database of the predetermined language in order to complement insufficient keywords.

In the character-unit candidate generation step, a character string related to at least one of the keywords may be added before or after a keyword so as to generate character unit candidates. In this case, a character string may be added in the same manner or need not be added for all of the other keywords so as to generate character unit candidates.

The text generation method according to present invention may further include, after the input step, an extraction step for extracting a sentence or phrase containing the keywords from the database; and a generation rule acquisition step for automatically acquiring a character-unit candidate generation rule from the extracted sentence or phrase, wherein the character unit candidates may be generated using the generation rule in the character-unit candidate generation step. The database may be a corpus of the language of the text generated in the present invention, for example, the Japanese language.

Additionally, in the generation rule acquisition step, the sentence or phrase extracted in the extraction step may be analyzed by using a morphological analysis and/or a syntactic analysis, and an analyzed character unit containing the keywords may be used as a generation rule.

Furthermore, the present invention can provide a text generation device for generating text of a sentence or paragraph in a predetermined language.

The device includes input means for inputting one or more words as keywords; character-unit candidate generation means for generating character unit candidates from the keywords; text candidate generation means for generating text candidates with assuming a dependency relation among the character units; evaluation means for evaluating the text candidates; and output means for outputting at least one of the evaluated text candidates.

Herein, in the input means, a word having a dependency relation to the input word may be input as an additional keyword using a database of the predetermined language.

Additionally, in the character-unit candidate generation means, a character string related to at least one of the keywords may be added before or after a keyword, and for all of the other keywords, a character string may be added in the same manner or need not be added so as to generate character unit candidates.

The text generation device according to the present invention may further include extraction means for extracting a sentence or phrase containing the keywords from the database; and generation rule acquisition means for automatically acquiring a character-unit candidate generation rule from the extracted sentence or phrase, wherein the character unit candidates may be generated using the generation rule in the character-unit candidate generation means.

In the generation rule acquisition means, the sentence or phrase extracted in the extraction means may be analyzed by using a morphological analysis and/or a syntactic analysis, and an analyzed character unit containing the keywords may be used as a generation rule.

Figure 1:
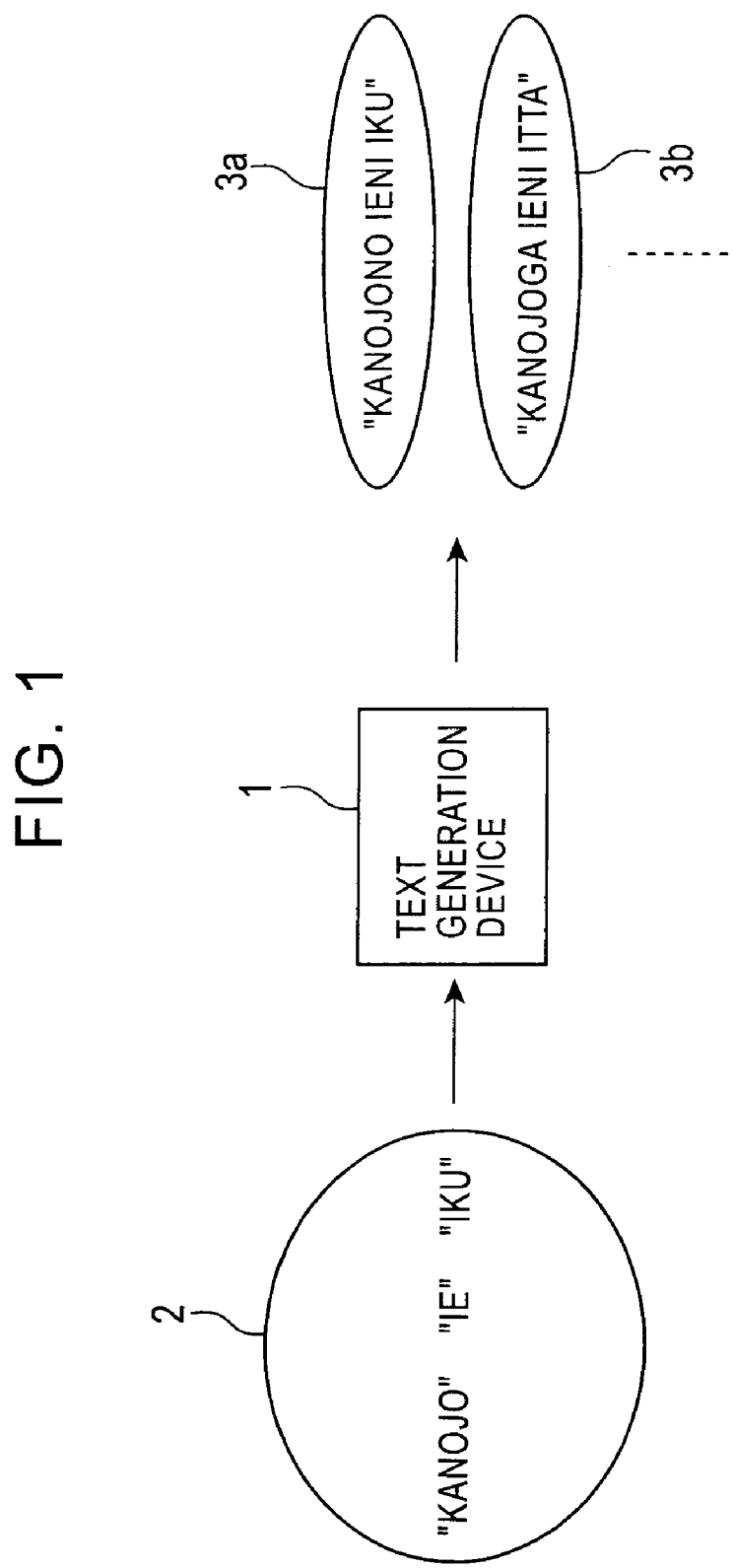
FIG. 1 is a diagram for explaining a text generation device according to the present invention.

| | Reference Numerals |
|---|---|
| 1 | text generation device |
| 2 | keyword |
| 3 | text |
| 4 | Bunsetsu-generation-rule acquisition unit |
| 5 | Bunsetsu-candidate generation unit |
| 6 | text candidate generation unit |
| 7 | evaluation unit |
| 8 | corpus |
| 9 | Bunsetsu generation rule |
| 10 | keyword generation model |
| 11 | language model |

BEST MODE FOR CARRYING OUT THE INVENTION

A preferred embodiment of the present invention will be described below with reference to the accompanying drawings. However, the present invention is not limited to the following embodiment, and can be appropriately modified.

FIG. 1 is a diagram for explaining a text generation device (1) according to the present invention (hereinafter referred to as simply the device (1)). As the simplest function of the device (1), when the device (1) receives three keywords (2), for example, "KANOJO", "IE", and "IKU", generates texts such as a text "KANOJONOIENIIKU" (3a) and text "KANOJOGAIENIITTA" (3b).

Figure 2:
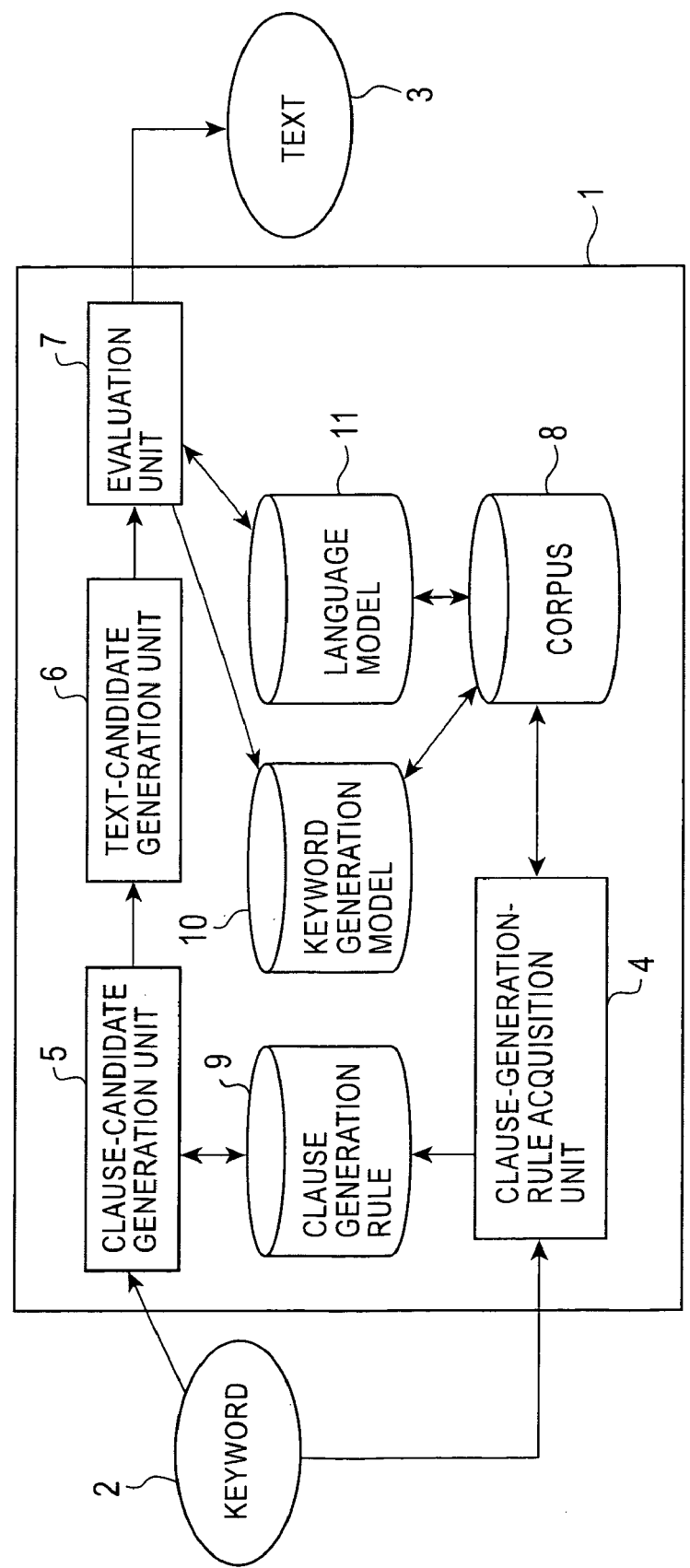
FIG. 2 is a block diagram of the text generation device according to the present invention.

An example of the device (1) includes units shown in FIG. 2. That is, the device (1) is composed of, for example, a personal computer that includes a CPU, a memory, and an external storage medium, such as a hard disk. The CPU carries out the main process and stores the processing result in a RAM and the external storage medium as needed.

According to the present invention, keywords (2) are input from a keyboard connected to the personal computer, or data output from another language processing system may be used as the keywords (2).

In this embodiment, the keywords (2) are used by two processing units. One is a Bunsetsu-generation-rule acquisition unit (4), and the other is a Bunsetsu-candidate generation unit (5).

Herein, the target language is Japanese, and a Bunsetsu is generated as a character unit. Moreover, Bunsetsus are minimal linguistic units obtained by segmenting a sentence naturally in terms of semantics and phonetics, and each of them consists of one or more morphemes. The keyword is defined as a head-word of the Bunsetsu. The word that becomes a head-word of the Bunsetsu is a content word nearest to the end of a sentence. As used herein, content refers to a direction word of a morpheme whose part of speech is a verb, an adjective, a noun, a demonstrative, an adverb, a conjunction, an adnominal, an interjection, or an undefined word. Other direction words of morphemes are considered to be function words. However, SA-hen verbs, the verb "NARU", and the formal noun "NO" are considered to be function words except when other content words do not exist in the Bunsetsu. The classification of the part of speech follows that in the Kyoto University corpus version 3.0 (Kurohashi and Nagao, 1997).

The Bunsetsu-generation-rule acquisition unit (4), upon receipt of keywords "KANOJO", "IE", and "IKU", searches for sentences containing each keyword from a corpus (8), and carries out a morphological analysis and a syntactic analysis (dependency analysis). Thereafter, the Bunsetsu-generation-rule acquisition unit (4) extracts Bunsetsu containing the keywords (2), acquires Bunsetsu generation rules (9) from the Bunsetsu, and stores them. For example, the Bunsetsu generation rules (9) for generating a Bunsetsu from a keyword include "KANOJO"→"KANOJONO", "IE"→"IENI", "IKU"→"IKU", and "IKU"→"ITTA".

Herein, the generation rules are automatically acquired by using the following technique. When a set of keywords is V and a set of rules for generating a Bunsetsu from a keyword k ($\in V$) is $R_k$, a rule $r_k$ ($\in R_K$) is expressed as:

$$k \to h_k m^*$$

where $h_k$ is a head morpheme and $m^*$ is any number of consecutive morphemes subsequent to $h_k$. When keywords are given, the Bunsetsu-generation-rule acquisition unit (4) automatically acquires rules to satisfy the above-described form from a monolingual corpus.

On the other hand, the Bunsetsu-candidate generation unit (5) generates candidates of Bunsetsus that constitute text (3) from the input keywords (2), while referring to the Bunsetsu generation rules (9).

For example, it is difficult for "KANOJO" to be a part of a natural text. Therefore, some phrase that has a close relation to the word "KANOJO" is added to be "KANOJONO" or "KANOJOGA", which is used for the subsequent process of text generation.

As described in this embodiment, by the Bunsetsu-generation-rule acquisition unit (4) generating Bunsetsu generation rules of the input keywords (2) from the corpus (8), the Bunsetsu generation rules are efficiently generated with a minimum amount of calculation, thus increasing the processing speed.

According to the present invention, although phrases associated with the keywords (2) are extracted from a corpus, any phrases may be added before and after each keyword (2) without using a corpus, depending on the computational power.

According to the present invention, since an evaluation unit (7), which will be described below, precisely evaluates candidates of a Bunsetsu even though any phrase is added, a Bunsetsu candidate having the highest evaluation value can be generated.

Subsequently, a text candidate generation unit (6) generates candidates of the text. The candidates of the text are represented in the form of a graph or a tree.

Figure 3:
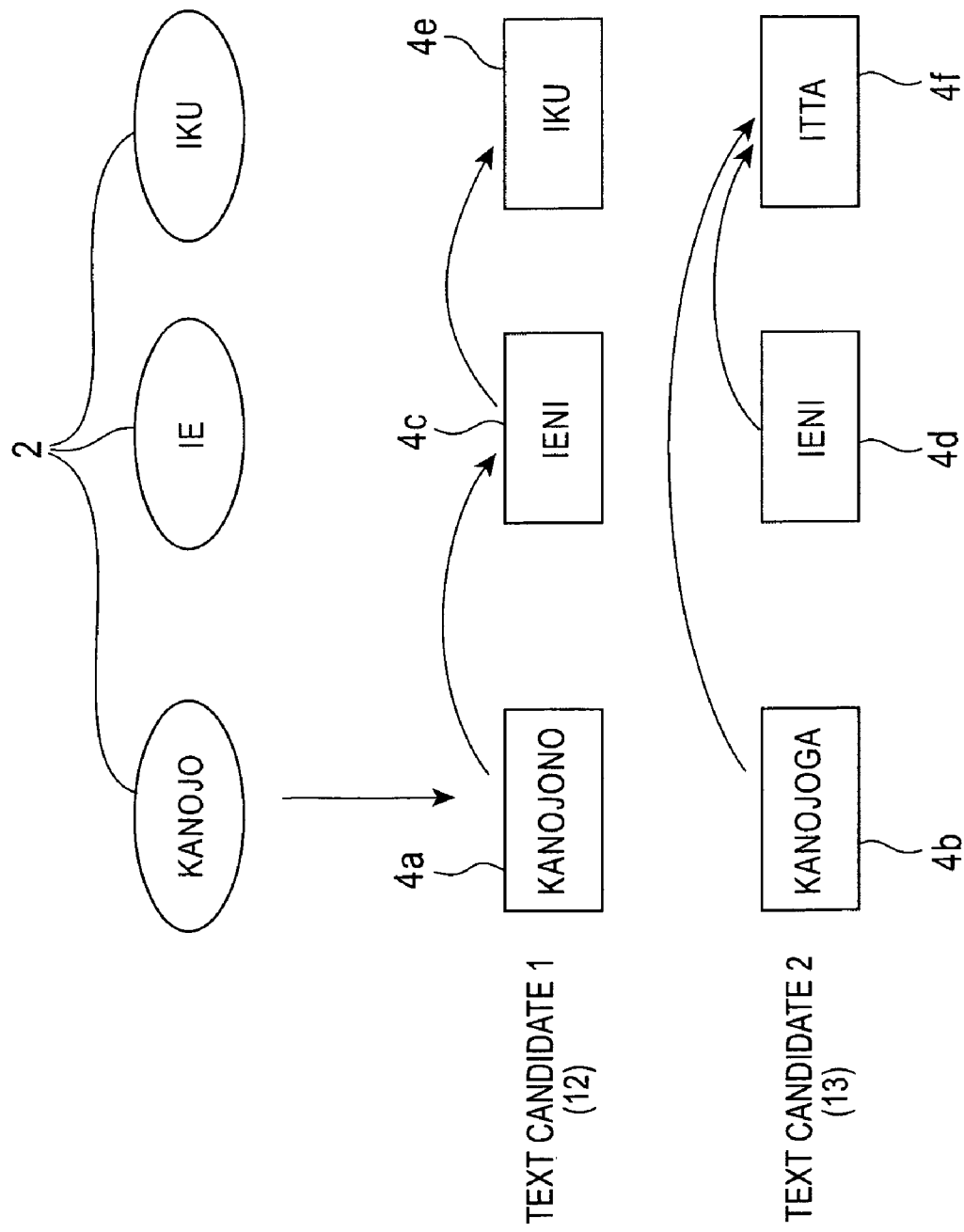
FIG. 3 shows an example for explaining text generation from keywords.

That is, as shown in FIG. 3, assuming that a dependency relation exists among the Bunsetsu candidates 4a to 4f, text candidates, such as a text candidate 1 (12) and a text candidate 2 (13), are generated in the form of a dependency structure tree in which each Bunsetsu is a node.

At this moment, the text candidates are generated in the form of a dependency structure tree so as to satisfy the following conditions:

(i) The dependency is directed from a preceding element to a following element (left to right modification).

(ii) The dependencies do not cross each other (cross dependency restriction).

(iii) A modifying element has only one modified element.

For example, in the case of three keywords, assuming that Bunsetsu candidates containing the keywords are b1, b2, and b3, if the order is fixed, two text candidates (b1 (b2 b3)) and ((b1 b2) b3) are generated. If the order is not fixed, sixteen text candidates are generated.

The generated text candidates, for example, the text candidates (12) and (13), are ordered by an evaluation unit (7)

using a keyword generation model (10) and a language model (11) that have learned from the corpus.

The keyword generation model (10) and the language model (11) will be described below as a morpheme model and a dependency model, respectively.

As the keyword generation model, models (KM1 to KM5) are considered using the following five types of information as primitives. Hereinafter, it is assumed that a keyword set V is a set of head words that appear more than a predetermined number of times in the corpus and Bunsetsus are represented as described above. Also, the keywords are independent. If a given text has a word sequence w1 . . . wm, a keyword ki corresponds to a word wj (1≦j≦m).

[KM1]

The Preceding Two Words are Considered (Trigram):

It is assumed that Ki is dependent on only the preceding two words wj-1 and wj-2.

$$P(K \mid M, D, T) = \prod_{i=1}^{n} P(k_i \mid w_{j-1}, w_{j-2}) \quad \text{[Equation 1]}$$

[KM2]

The Subsequent Two Words are Considered (Backward Trigram):

It is assumed that Ki is dependent on only the subsequent two words wj+1 and wj+2.

$$P(K \mid M, D, T) = \prod_{i=1}^{n} P(k_i \mid w_{j+1}, w_{j+2}) \quad \text{[Equation 2]}$$

[KM3]

Figure 4:
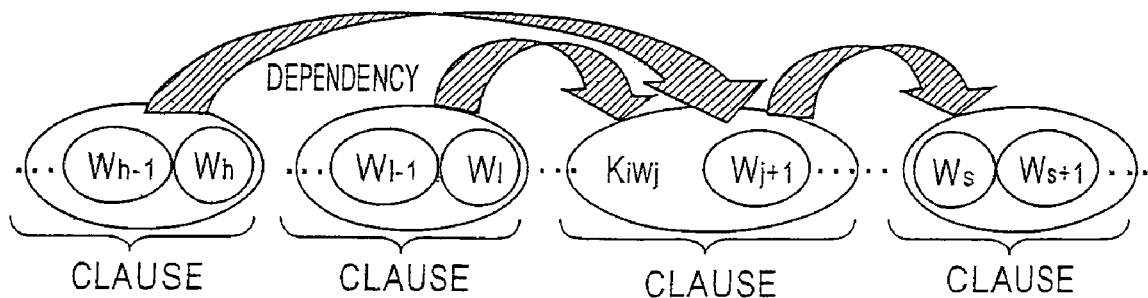
FIG. 4 is a diagram for explaining a relationship between a keyword and other words.

Modifying Bunsetsus are Considered (Modifying Bunsetsu):

It is assumed that, if Bunsetsu that modify the Bunsetsu containing Ki exist, Ki is dependent on only two words w1 and w1-1 in the Bunsetsu nearest to the end of the sentence (refer to FIG. 4).

$$P(K \mid M, D, T) = \prod_{i=1}^{n} P(k_i \mid w_l, w_{l-1}) \quad \text{[Equation 3]}$$

[KM4]

A Modified Bunsetsu is Considered (Modified Bunsetsu):

It is assumed that, if a Bunsetsu that is modified by the Bunsetsu containing Ki exist, Ki is dependent on only two head words ws and ws+1 in the modified Bunsetsu (refer to FIG. 4).

$$P(K \mid M, D, T) = \prod_{i=1}^{n} P(k_i \mid w_S, w_{S+1}) \quad \text{[Equation 4]}$$

[KM5]

At Least Two Modifying Bunsetsus are Considered (Two Modifying Bunsetsus):

It is assumed that, if Bunsetsus that modify the Bunsetsu containing Ki exist, Ki is dependent on only the last two words w1 and w1-1 in the Bunsetsu nearest to the end of the sentence and the last two words wh and wh-1 in the Bunsetsu nearest to the beginning of the sentence (refer to FIG. 4).

$$P(K \mid M, D, T) = \prod_{i=1}^{n} P(k_i \mid w_l, w_{l-1}, w_h, w_{h-1}) \quad \text{[Equation 5]}$$

The morpheme model (MM) will be described next. Herein, it is assumed that there are l grammatical properties, one of which is assigned to a morpheme. A model used here finds a probability of likelihood that, when text, that is, a character string is given, the character string is a morpheme and the morpheme has the jth (1≦j≦l) grammatical property.

When text T is given, the probability of obtaining an ordered morpheme set M is given by the following equation, assuming that morphemes mi (1≦i≦n) are independent from each other.

$$P(M \mid T) = \prod_{i=1}^{n} P(m_i \mid (m_1^{i-1}, T)) \quad \text{[Equation 6]}$$

where mi is one of the grammatical properties from 1 to l.

On the other hand, in a dependency model (DM), when text T and an ordered morpheme set M are given, the probability of obtaining an ordered set D of the dependency relation of every Bunsetsu is given by the following equation, assuming that the dependency relations d1, . . . , dn are independent from each other.

$$P(D \mid M, T) = \prod_{i=1}^{n} P(d_i \mid M, T) \quad \text{[Equation 7]}$$

For example, when three keywords "KANOJO KOUEN ITTA" are input and two candidates "(KANOJOWA(KOUENEITTA))" and "((KANOJONOKOUENE)ITTA)" are generated, the dependency model prioritizes one candidate having a more likely dependency structure over the other candidate.

According to the present invention, using the above-described models, the evaluation unit (7) evaluates the text candidates, such as text candidates (12) and (13).

Subsequently, a text candidate having a maximum evaluation value, text candidates having an evaluation value greater than a predetermined threshold, or text candidates having top N evaluation values are converted to surface sentences, which are then output.

The surface sentences are output on a monitor. Alternatively, they may be output as a voice by a speech synthesizer or may be output as data delivered to another language processing system, such as a translation system.

Thus, when the keywords (2), for example, "KANOJO", "IE", and "IKU" are input, the texts (3) including "KANOJONOIENIIKU" (3a) and "KANOJOGAIENIITTA" (3b) can be output. As described above, the text having a maximum evaluation value may be output. Alternatively, a plurality of the texts may be output in an evaluation value order. For example, a plurality of the texts may be output and an operator who inputs the keywords may select the most appropriate text among them.

In the above-described embodiment, although some phrases are added to the front and end of the keyword, the keyword itself (corresponding to a head word) can be complemented.

For example, in order to complement predicates to "KARE HON" and generate "KAREGAHONWOYONDA", "KAREGAHONWOKAITA", and "KAREGAHONWOKATTA", additional keywords can be input to the input keyword.

Figure 5:
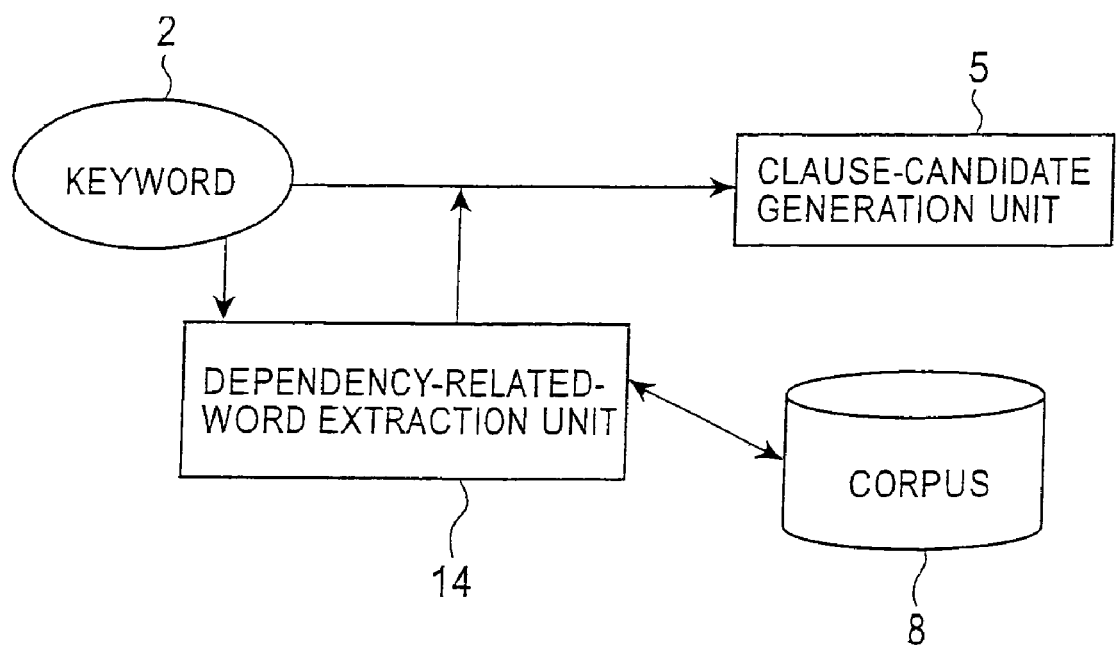
FIG. 5 is a block diagram of a dependency-related-word extraction unit according to the present invention.

More specifically, components shown in FIG. 5 are added to the structure shown in FIG. 2. That is, the keywords (2) are also input to a dependency-related-word extraction unit (14), which extracts words having a dependency relation to the keywords (2) from the corpus (8).

Subsequently, the words are input as additional keywords along with the original keywords (2) to the Bunsetsu-candidate generation unit (5).

For example, if the corpus (8) does not contain "(KAREGA(HONWO YOMU))", but contains dependency relations "(KAREGA YOMU)" and "(HONWO YOMU)", the Bunsetsu-candidate generation unit (5) can generate "YONDA" by adding "YOMU", which is common to the two dependency relations, as a new keyword.

Although this structure can decrease the amount of calculation and allows keywords to be added at high speed, the present invention is not limited to extracting words having a dependency relation from a corpus. Alternatively, any keyword candidates may be added, and texts having the highest evaluation value by the evaluation unit (7) may be output.

Thus, meaningful texts can be output even though some important words that determine the meaning of the text are not included in the keywords.

In addition, although the generated text is Japanese and the character unit generated from the text is a Bunsetsu in the above-described embodiment, the present invention can be applied to any language.

For example, for the English language, a plurality of noun phrases and verb phrases may form other noun phrases and verb phrases, respectively, to form a hierarchy structure. In this type of language, a minimal phrase, "basic phrase", can be used instead of the Bunsetsu.

TABLE 1

| INPUT (KEYWORD) | | | EXAMPLE OF SYSTEM OUTPUT |
|---|---|---|---|
| ROSIA | RENPA | TASSEI | (ROSIADE (RENPAWO TASSEISITA)) |
| SEKAI | KIROKU | KAWARU | ((SEKAINO KIROKUNI) KAWARU) |
| KADAI | JITUGEN | IDOMU | ((KADAINO JITUGENNI) IDOMU) |
| CHIIMU | TOMONI | KATU | (CHIIMUDE (TOMONI KATTA)) |
| KONO | KEIKAKU | KIMERU | |
| SENGO | SEIKATU | SASAERU | ((SENGONO SEIKATUWO) SASAERU) |
| DAITOURYO | KAIKEN | CHINJUTSU | ((DAITOURYONO KAIKENNO) CHINJUTU) |
| YOUGISHA | CHUGOKU | TAIHO | (YOUGISHAWA (CHUGOKUDE TAIHOSARETA)) |
| NIPPON | GORIN | KAISAI | |
| KUNI | SEISAKU | HOSSOKU | ((KUNINO SEISAKUGA) HOSSOKUSURU) |
| KADAI | JITSUGEN | MUKAU | ((KADAINO JITSUGENNI) MUKAU) |
| SHAKAI | HATARAKU | JOSEI | ((SHAKAINI HATARAITEIRU) JOSEI) |
| SHUSHO | SEIKEN | DAKKAI | (SHUSHOGA (SEIKENWO DAKKAISURU)) |
| TEIAN | MINAOSHI | TSUKURU | ((TEIANNO MINAOSHIWO) TSUKURU) |
| SEIKEN | HOSSOKU | KIMARU | (SEIKENGA (HOSSOKUNI KIMATTA)) |
| HONKON | KURUU | OOI | (HONKONWA (KURUUMO OOIRASII)) |
| TAIKAI | SHUTSUJO | KATU | |
| SHOGATU | RYOKOU | KYUZOU | ((SHOGATUNO RYOKOUMO) KYUZOUSHITEIRU) |
| MINSHUKA | HANTAI | HITO | ((MINSHUKANI HANTAISHITEIRU) HITO) |
| SAKUNEN | SEISAKU | MITOMERU | ((SAKUNENNO SEISAKUWO) MITOMERUBEKIDA) |
| BEIKOKU | KATSU | AKIRAKADA | ((BEIKOKUNI KATEBA) AKIRAKANINARU) |
| JUMIN | UTAGAI | HIROGARU | ((JUMINNO UTAGAIGA) HIROGARU) |
| NIPPON | CHUGOKU | CHIKAI | |
| GAIKOKUJIN | KA'NYU | ZOUKA | ((GAIKOKUJINNO KA'NYUSHAGA) ZOUKASHITEIRU) |
| GORIN | SENSHUKEN | KAKUTOKU | ((GORINNO SENSHUKENWO) KAKUTOKUSURU) |
| KIGYO | TEPPAI | SUSUMERU | (KIGYOGA (TEPPAIWO SUSUMERU)) |
| SHORAI | SHINSHINTO | UMARERU | (SHORAIWA (SHINSHINTOGA UMARERUDAROU)) |
| SAKUNEN | KIROKU | UWAMAWARU | ((SAKUNENNO KIROKUWO) UWAMAWARU) |
| TSUYOI | CHIIMU | MEZASU | |
| YOI | SHIGOTO | HOSHII | |

Finally, experimental results using the text generation method according to the present invention are shown. In the experiment, combinations of three keywords shown in Table 1 were input and the output texts were subjectively evaluated. The following two criteria for the evaluation were used:

Criterion 1: If the top candidate is semantically and grammatically appropriate, it is determined that the output of the system is correct.

Criterion 2: If a semantically and grammatically appropriate candidate is found among the top 10 candidates, it is determined that the output of the system is correct.

The evaluation results are shown in Table 2.

TABLE 2

| Model | Criterion 1 | Criterion 2 |
|---|---|---|
| KM1 (trigram) | 13/30 | 28/30 |
| KM1 + MM | 21/30 | 28/30 |
| KM1 + DM | 12/30 | 28/30 |
| KM1 + MM + DM | 26/30 | 28/30 |
| KM2 (backward trigram) | 6/30 | 15/30 |
| KM2 + MM | 8/30 | 20/30 |
| KM2 + DM | 10/30 | 20/30 |
| KM2 + MM + DM | 9/30 | 25/30 |

TABLE 2-continued

| Model | Criterion 1 | Criterion 2 |
| --- | --- | --- |
| KM3 (modifying Bunsetsu) | 13/30 | 29/30 |
| KM3 + MM | 26/30 | 29/30 |
| KM3 + DM | 14/30 | 28/30 |
| KM3 + MM + DM | 27/30 | 29/30 |
| KM4 (modified Bunsetsu) | 10/30 | 18/30 |
| KM4 + MM | 9/30 | 26/30 |
| KM4 + DM | 9/30 | 22/30 |
| KM4 + MM + DM | 13/30 | 27/30 |
| KM5 (two modifying Bunsetsus) | 12/30 | 26/30 |
| KM5 + MM | 17/30 | 28/30 |
| KM5 + DM | 12/30 | 27/30 |
| KM5 + MM + DM | 26/30 | 28/30 |

When combinations of two keywords were input, the number of text candidates generated by the generation rules was an average of 868.8 (26,064/30) per combination. When combinations of three keywords were input, the number was an average of 41,413.5 (1,242,404/30) per combination.

In Table 2, combinations of one of the above-described keyword generation models (KM1 to KM5) and the language models (MM and/or DM) are represented using the sign "+".

As can be seen from Table 2, the case where the model KM1, KM3, or KM5 is combined with the models MM and DM exhibits the best results. The cases using MM and DM exhibit significantly better results for the criterion 1 compared to the cases not using MM and DM. This is because a relationship between a verb and a case of the verb is stronger than that between a noun and a case of the noun and the models KM1, KM3, and KM5 have learned based on the relationship between a verb and a case of the verb. Therefore, it seems more likely that these models potentially order candidates that generate natural sentences at higher positions.

From the result of the experiment, in the evaluation unit (7) according to the present invention, the above-described model KM1, KM3, or KM5 is preferably combined with the morpheme model and the dependency model, and the model KM3 is the most preferable.

As shown in Table 2, these combinations successfully provide correct texts at a rate of about 90 percent.

Finally, the text generation methods according to Claims 1 to 5 of the present invention can provide a meaningful text that is difficult to generate by known methods when the number of input keywords is insufficient.

In particular, since the text generation method according to Claim 2 of the present invention can extract words having a dependency relation to the keywords and can add them as additional keywords, more extensive text creation is achieved.

Alternatively, since the text generation method according to Claim 4 of the present invention can automatically acquire rules for generating candidates of a character unit from extracted sentences and phrases, the candidates of a character unit are efficiently generated, and therefore, the process is speeded up.

Furthermore, the text generation devices according to Claims 6 to 10 of the present invention can provide a meaningful text that is difficult to generate by known methods when the number of input keywords is insufficient.

In particular, since the text generation device according to Claim 7 of the present invention can extract words having a dependency relation to the keywords and can add them as additional keywords, more extensive text creation is achieved.

Since the text generation device according to Claim 9 of the present invention can automatically acquire rules for generating candidates of a character unit from extracted sentences and phrases, the candidates of a character unit are efficiently generated, and therefore, the process is speeded up and the cost is reduced.

As described above, according to the present invention, a text generation device that provides an excellent text generation method can be created and can contribute to improved natural language processing technology.

The invention claimed is:

1. A text generation method for generating text of a sentence or paragraph in a predetermined language using a text generation device, comprising:
   inputting one or more words as keywords into the text generation device;
   generating phrase candidates in the text generation device from the keywords by searching for and extracting from a corpus sentences or phrases containing each keyword;
   generating text candidates of a sentence or paragraph in the text generation device assuming a syntactic dependency relation among the phrase candidates;
   evaluating the text candidates generated in the text generation device;
   converting the text candidates generated in the text generation device to surface sentences; and
   outputting at least one of the surface sentences.

2. The text generation method according to claim 1, wherein, in the step of inputting one or more words into the text generation device, a word having a dependency relation to the input word is extracted from a database of predetermined language and input as an additional keyword.

3. The text generation method according to claim 1 or 2, wherein, in the step of generating phrase candidates in the text generation device, a character string related to at least one of the keywords is added before or after the keyword, and for all of the other keywords, a character string is added in the same manner or is not added so as to generate phrase candidates.

4. The text generation method according to claim 1, further comprising:
   automatically acquiring a character-unit candidate generation rule;
   wherein the phrase candidates are generated using the generation rule.

5. The text generation method according to claim 4, wherein, the sentences or phrases containing each keyword are analyzed by using a morphological analysis and/or a syntactic analysis, and an analyzed phrase candidate containing the keywords is used as a generation rule.

6. A text generation device for generating text of a sentence or paragraph in a predetermined language, comprising:
   input means for inputting one or more words as keywords into the text generation device;
   character-unit candidate generation means for generating phrase candidates from the keywords in the text generation device by searching for and extracting from a corpus sentences or phrases containing each keyword;
   text candidate generation means for generating text candidates of a sentence or paragraph assuming a syntactic dependency relation among the phrase candidates;
   evaluation means for evaluating the text candidates;
   means for converting the text candidates generated in the text generation device to surface sentences; and
   output means for outputting at least one of the surface sentences.

7. The text generation device according to claim 6, wherein, in the input means, a word having a dependency relation to the input word is extracted from a database of the predetermined language and input as an additional keyword.

8. The text generation device according to claim 6 or 7, wherein, in the character-unit candidate generation means, means to add a character string related to at least one of the keywords before or after the keywords, and for all of the other keywords, means for adding a character string in the same manner or not adding a character string so as to generate phrase candidates.

9. The text generation device according to claim 6, further comprising:
    generation rule acquisition means for automatically acquiring a character-unit candidate generation rule from the extracted sentence or phrase;
    wherein the phrase candidates are generated using the generation rule in the character-unit candidate generation means.

10. The text generation device according to claim 9, wherein, in the generation rule acquisition means, the sentence or phrase extracted in the extraction means is analyzed by using a morphological analysis and/or a syntactic analysis, and an analyzed phrase containing the keywords is used as a generation rule.

11. A text generation method for generating text of a sentence or paragraph in a predetermined language using a text generation device, comprising:
    inputting one or more words as keywords into the text generation device;
    inputting keywords to a dependency-related word extraction unit which extracts words having a dependency relation to keywords in a corpus;
    subsequently inputting the extracted words along with the keywords inputted to the dependency-related word extraction unit to a candidate generation unit;
    generating phrase candidates in the text generation device from the keywords by searching for and extracting from the corpus sentences or phrases containing each keyword;
    generating text candidates of a sentence or paragraph in the text generation device assuming a syntactic dependency relation among the phrase candidates;
    evaluating the text candidates generated in the text generation device;
    converting the text candidates generated in the text generation device to surface sentences; and
    outputting at least one of the surface sentences.

* * * * *